US011489829B1

United States Patent
Ulrich et al.

(10) Patent No.: US 11,489,829 B1
(45) Date of Patent: Nov. 1, 2022

(54) AUTOMATIC ACCOUNT PROTECTION FOR COMPROMISED CREDENTIALS

(71) Applicant: Wells Fargo Bank, N.A., San Francisco, CA (US)

(72) Inventors: Erica Ulrich, San Francisco, CA (US); Lizmari Brignoni, Gilbert, AZ (US); Jason Britt, Birmingham, AL (US); Tobe B. Bassior, Walnut Creek, CA (US); Mark David Castonguay, Corte Madera, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 362 days.

(21) Appl. No.: 16/721,853

(22) Filed: Dec. 19, 2019

Related U.S. Application Data (60) Provisional application No. 62/784,246, filed on Dec. 21, 2018.

(51) Int. Cl.
*H04L 9/40* (2022.01)
*G06F 9/54* (2006.01)
*H04L 9/06* (2006.01)

(52) U.S. Cl.
CPC ............ *H04L 63/083* (2013.01); *G06F 9/542* (2013.01); *H04L 9/0643* (2013.01); *H04L 63/0815* (2013.01); *H04L 63/0861* (2013.01)

(58) Field of Classification Search
CPC . H04L 63/083; H04L 9/0643; H04L 63/0815; H04L 63/0861; G06F 9/542
See application file for complete search history.

(56) References Cited

U.S. PATENT DOCUMENTS

| | | | |
|---|---|---|---|
| 10,523,686 B1 * | 12/2019 | Mehta | H04L 63/083 |
| 10,567,375 B1 * | 2/2020 | Mossier | H04L 63/101 |
| 2003/0131096 A1 * | 7/2003 | Goringe | H04L 63/08 709/224 |
| 2015/0254452 A1 * | 9/2015 | Kohlenberg | G06F 21/45 726/6 |
| 2017/0149840 A1 * | 5/2017 | Zhang | H04L 63/205 |
| 2017/0223001 A1 * | 8/2017 | Haddad | G06Q 30/08 |

* cited by examiner

*Primary Examiner* — Ali S Abyaneh
(74) *Attorney, Agent, or Firm* — Schwegman Lundberg & Woessner, P.A.

(57) ABSTRACT

A method may include receiving a data file including a plurality of tuples, each respective tuple including a username and password; matching a username from a tuple in the data file to a username of an account stored in an account database; determining that the password from the tuple matches a password for the account; in response to the determining indicating a match, setting a security flag for the account identifying the account as compromised; subsequent to the security flag being set, receiving a login request with validated credentials for the account from a computing device; and in response to the login request, transmitting a request to the computing device to modify the password for the account.

16 Claims, 5 Drawing Sheets

FIG. 5 under 35 U.S.C. § 119(e), to U.S. Provisional Patent Application Ser. No. 62/784,246, titled "AUTOMATIC ACCOUNT PROTECTION FOR COMPROMISED CREDENTIALS," filed on Dec. 21, 2018, which is incorporated by reference in its entirety.

AUTOMATIC ACCOUNT PROTECTION FOR COMPROMISED CREDENTIALS

CROSS-REFERENCE TO RELATED PATENT DOCUMENTS

This patent application claims the benefit of priority, under 35 U.S.C. § 119(e), to U.S. Provisional Patent Application Ser. No. 62/784,246, titled "AUTOMATIC ACCOUNT PROTECTION FOR COMPROMISED CREDENTIALS," filed on Dec. 21, 2018, which is incorporated by reference in its entirety.

BACKGROUND

Companies, websites, and services are routinely hacked to steal credentials of users. The stolen credentials may be used to log into not only the originating website, but any others where the user uses the same username and password. Accordingly, when a website is hacked, that website may often notify its user base and suggest or require that they change a password.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In the following description, for purposes of explanation, numerous specific details are set forth in order to provide a thorough understanding of the provided examples. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

As indicated above, credentials are frequently stolen from many network-enabled locations (e.g., web servers). Unfortunately, actions taken by a website to mitigate the fallout from having the credentials stolen are often limited to that specific website. If a user has used the name username/password combination (also referred to as credentials) on multiple websites, applications, etc., the hacked website would have no knowledge of these other websites. In many cases, even the user may not be aware of all the sites that the user has non-unique username/passwords. This may be particularly problematic if the user has used the same credentials on more sensitive websites such as financial or health related websites.

Accordingly, even if the hacked website notifies the user of the breach of credentials, it is unlikely the user will change all other websites with the same credentials. The problem may be even worse if the hacked website does not realize they have been hacked. In such instances, the user may have multiple compromised accounts without even knowing.

In view of this problem, some companies/websites may proactively look for credential lists from hacked sites to protect their own users. These credentials lists may originate on the so-called Dark Web, from law enforcement agencies, or third-party vendors (e.g., security firms, etc.). The credential lists may be used to look for compromised accounts on their own websites/services. A variety of problems may arise when manually checking credential lists against account databases, etc. For example, if a website simply tries to log in using credentials, it is possible that a user's account may be locked out based on a number of unsuccessful login attempts. Another problem may be that each credential list may be in a different format and thus require an ad-hoc approach to testing.

Both of these problems result in a time-consuming process that leads to potentially compromised accounts not being protected in a timely fashion. Depending on the compromised account the effects of the delay may mean loss of private information, financial fraud, or loss of system control if the account has administrator access. In view of the above problems, a system is described herein that standardizes and efficiently and securely tests multiple credential lists (referred to as credential files) against accounts to find compromised accounts.

Figure 1:
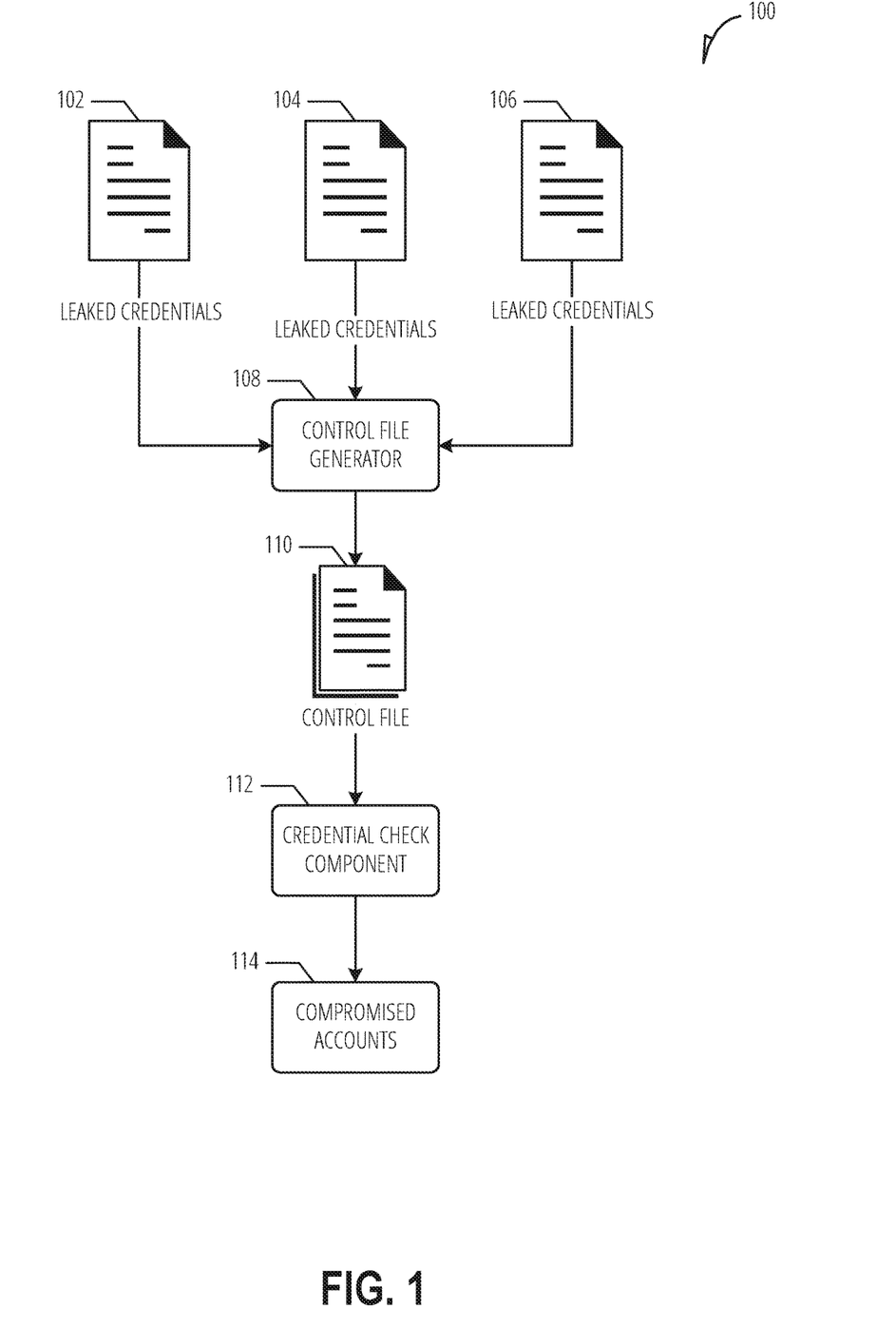
FIG. 1 is a process flow diagram to determine compromised accounts, according to various examples.

FIG. 1 is a process flow diagram to determine compromised accounts, according to various examples. An overview of the displayed components is discussed with respect to FIG. 1; however, a more thorough description is provided in the context of FIG. 2. FIG. 1 includes leaked credentials 102, leaked credentials 104, leaked credentials 106, control file generator 108, control file 110, credential check component 112, and compromised accounts 114. The process in FIG. 1 may be performed by a company/website to check if any of the company/website's users' credentials may have been compromised on other websites. The process in FIG. 1 may be run periodically (e.g., daily).

Leaked credentials 102, 104, 106 may represent three different sets of credential files. Each credential file may originate from a different location (e.g., forums, Dark Web, etc.) and may be formatted in different ways. Formats may include usernames with hashed passwords, users' names with plain text passwords, comma separated values, spreadsheet files, etc. In order to allow a single process to be run against the leaked credentials, the leaked credential files may be standardized into a common format before being processed by control file generator 108. The common format may at least include a tuple of a user name and a hashed password.

Control file generator 108 may generate control file 110. Control file 110 may identify the file names of the standardized credential files. Credential check component 112 may determine if the credentials in any of the standardized credential files matches the credentials of accounts in an account database. The result of credential check component 112 may be compromised accounts 114. Each compromised account may have a security flag set indicating the compromised status.

Figure 2:
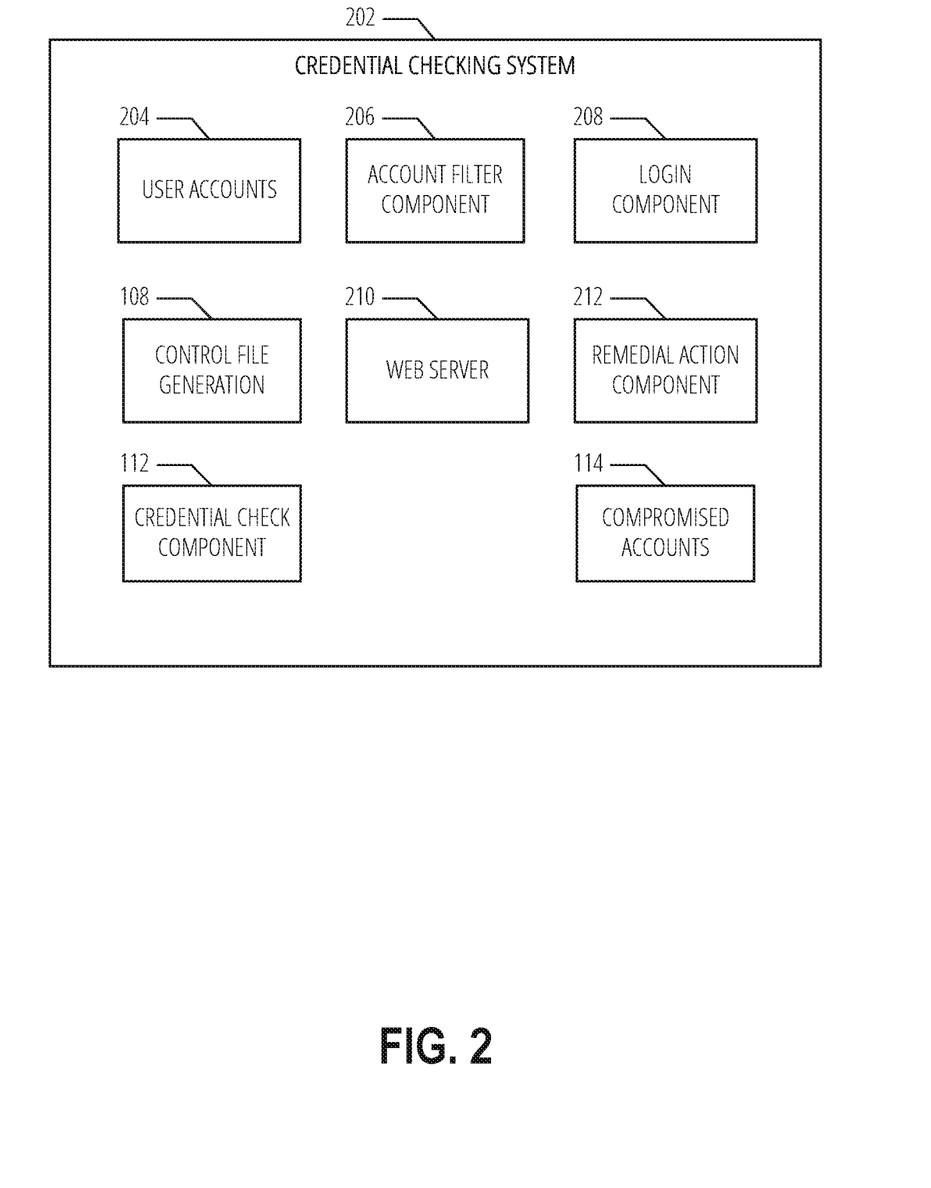
FIG. 2 is a component diagram of a credential checking system, according to various examples.

FIG. 2 is a component diagram of a credential checking system 202, according to various examples. Credential checking system 202 includes user accounts 204 (e.g., an account database), account filter component 206, login component 208, web server 210, remedial action component 212, control file generator 108, credential check component 112, and compromised accounts 114.

For illustration purposes, credential checking system 202 is illustrated as set of separate functional units (e.g., account filter component 206, login component 208, control file generator 108, etc.). However, the functionality of multiple functional units may be performed by a single unit. A functional unit may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Although not illustrated, credential checking system 202 may be communicatively coupled to other devices such as a user computing device, other web servers that host credential files, etc. These devices may connect to credential checking system 202 via one or more networks. A computing device may include, but is not limited to, a smartphone, tablet, laptop, multi-processor system, microprocessor-based or programmable consumer electronics, game console, set-top box, or any other device that a user utilizes to communicate over the network. In various examples, the computing devices include a display module (not shown) to display information (e.g., in the form of specially configured user interfaces) to interact with credential checking system 202.

A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

User accounts 204 may include information on users associated with credential checking system 202. As a running example, consider that credential checking system 202 is part of Acme Corp (Acme). Acme may have a userbase that it is trying to proactively protect against leaks from other companies, services, etc. Acme may be a financial institution, a health care provider, a merchant, etc. A user account may include profile information such as the user's real name, a username for login purposes, and user preferences as they relate to Acme. A hashed version of the user's password may also be stored in the user account. In various examples, the password is not stored in the account but as part of a password database that stores all users' names and hashed passwords.

In addition to the user-facing preferences, login name, etc., a user account may store account information for use by Acme. For example, a security flag (e.g., a variable value/Bool) may be set that indicates a user's account has been compromised and requires a new username, a new password, or both. In some examples, a list of compromised accounts is stored in a separate file or database table such as compromised accounts 114.

Control file generator 108 may take, as input, a set of credential files. The credential files may be any format and automated scripts may be run to transform the credential files into a common credential file format and listed in a control file. Each transformed credential file may contain the data that will be used for account validation by credential check component 112. Each credential file listed in the control file may be processed individually by credential check component 112. Each credential file's record count and checksum may be validated before processing. In various examples, each credential file is compressed (e.g., in a gz format). The description below has specific formats, delineation characters, etc., for credential files and control files. As one of ordinary skill in the art would recognize, these formats are examples and other formats may be used without departing from the scope of this disclosure.

The format of a credential file may be source_YYYYMMDD.gz where YYYYMMDD is the date when the credential filed was received by credential checking system 202. An example, credential file may be phishlabs_20170522.gz. The contents of the credential file may include three sections: (1) a header; (2) data to validate; and (3) a footer. The header format may be HYYYYMMDDHHmmss. The time may be the current timestamp when the credential file is provided to credential check component 112 such as H20160711192600.

For each record that that requires validation, there may be three required fields in each line of the control file. The fields may be separated by a '|'.

| Field | Field Name | Contents/Format | Description/Notes |
|---|---|---|---|
| 1 | Username | UserID/Username Example: johniscoo188 | Format should match Acme's username format (e.g., less than 16 characters). Other format may be skipped in some examples. |
| 7 | Password | HEX based representation of SHA256 Password. Example: 43c8abea5c7380abde07818932686c 0bcec8571407de0261b3de864ec38a 0c11 | The case of the HEX value itself is of course not case sensitive. In HEX there isn't a difference between a 43c8 and a 43C8. |

-continued

| Field | Field Name | Contents/Format | Description/Notes |
|---|---|---|---|
| 3 | Password Enhanced | HEX based representation of SHA256 Enhanced Password. Example: 3083086f6677277d581a8622a5414 ddfdc87b913ab8cc9a1aea7e6302e4 7ad79 | The case of the HEX value itself is of course not case sensitive. Ie. In HEX there isn't a difference between a 43c8 and a 43C8. |

The footer format may be F #########. The footer may be the last line of the credential file and be a nine-digit decimal with the record count such as F000000005. An example credential file with shortened hashes for readability with five user names may be
H20160711192600
fbbceeff|43 cbce . . . c38a0c|308308 . . . 6302e47ad79
bdfecedf|fcc26e . . . 654178|8b6923 . . . a8d22ad75d3
cdcdaccb7|89d4b . . . d1ee00|3c4dfe . . . 8ba459808eb
fccbacfa4|b500b . . . f3 c0bb|6c36d6 . . . c8e2eaf3314
caebfbed27|48f2 . . . 89d4e9|234a20 . . . 93978a75337
F000000005

The name and control file produced by control file generator 108 may be as identified below. Periodically (e.g., daily), credential check component 112 may check for a new control file. The format of the name of the control file may be autodisable_YYYYMMDD.ctl such as autodisable_20170522.ctl. There may be four fields in each line of the control file separated by a '|'.

| Field | Field Name | Contents/Format | Description |
|---|---|---|---|
| 1 | Action to take | A (audit-only) or P (process) | Indicates if the file needs to be audited-only (with metrics sent via email to a distribution list) OR processed (where the customer account is updated). This field should have the same value for ALL the files listed in the ctl file. |
| 2 | Delimiter | \| | Delimiter |
| 3 | Filename | Filename (no spaces allowed) Example: fsisac 20170522.gz | Identifies the name of a file that should be checked. The file may be compressed. Up to 30 characters. |
| 4 | Delimiter | \| | Delimiter |
| 5 | Number of UserID Entries | Integer Example: 1001 | Number of UserMs/Usernatnes to evaluate in the file. |
| 6 | Delimiter | \| | Delimiter |
| 7 | MD5 Checksum of File | MD5 Checksum (128-bit) value as defined in RFC 1321 Example: 113a078b4da35be0868d011ad1b66dce | NID5 Checksum used to validate the file itself. |
| 8 | Delimiter | \| | Delimiter |
| 9 | Description Freeform text | String with more detailed | description of source/vendor of credential file. Up to 500 characters. |

Each row listed in the Control File represents a Credential File that may be provided to credential check component 112 for validation during that day's processing. This may allow for processing files from multiple sources. Example of contents of a Control file:

A|phishlabs_20170522.gz|10000|113a078868d011ad1b66 dce|File 1 from Phishlabs
A|fsisac_20170522.gz|100|13e52d5d6097fcec2826d2b7dd 47c|File from FBI
A|mynetwatchman_20170522.gz|1|2e2b5a1f9b4f75944655 26|Daily File
A|darkweb_20170812.gz|900|4f2b5a1fdbc6b334f7594465 526|Site: Pwn4Us Because of the sensitive nature of the data being passed around between components, which may be processed on different computers, various security measures may be used to protect data at rest and in transit. For example, an application programming interface (API) may use tokens or API keys to ensure only authorized parties may retrieve or process credential files or control files. Additionally, data transmitted over the network may use a cryptographic protocol, such Secure Socket Layer (SSL) or Transport Layer Security (TLS). As a further security precaution, the transmitted data itself may be encrypted, separately from the SSL or TLS encryption. Public-key infrastructure (PKI) may be leveraged for SSL/TLS as well as the separate data encryption.

Accordingly, when control file generator 108 passes data to credential check component 112, there may be no risk that if data is intercepted it may be compromised. Additionally, in some examples, the data is only decrypted by the component during processing. Thus, even employees may not be able to see the usernames and hashed passwords, which further protects the users' privacy.

Credential check component 112 may batch process each of the credential files in the control file for the day. Other frequencies of processing may be implemented without departing from the scope of this disclosure. In some example if the number of records exceed a threshold (e.g., 100 million) the processing may be performed over two days. For a username in a credential file, credential check component 112 may first check if the username matches an account in user accounts 204 by using account filter component 206. If there is a match, credential check component 112 may check the account to see if the account has a regular password or an enhanced password. The precise differences between a regular password and an enhanced password are beyond the scope of this disclosure; however, it is sufficient to understand that different accounts may have different classifications of passwords. The appropriate password version may be checked against the hashed passwords in the credential files.

One method of checking for a compromised account may include querying an account database with the username/hashed password pair to see if there is a match. Another method of checking may include simulating a login event via login component 208. Part of the call to login component 208 may indicate that the call is for checking credentials, not for retrieving customer information. In contrast to a regular user, however, if the login fails, a failed attempt counter may not increase because the user is not actually logging in. Accordingly, the user may not be locked out based on credential check component 112 attempting too many incorrect passwords in a set time period (e.g., three in two minutes). Without such a precaution, if a user has a common username, it is likely the user would constantly be locked out.

If the validation of username & password received in credentials file(s) matches an existing username/password combination, the Security Flag may be set per the following rules. If the current Security Flag is 'compromised', do not make any updates. If the current Security Flag is 'suspect', reassign status to 'compromised'. The Security Flag may also include a timestamp of the update. If no status is set, set to 'compromised', and add a new timestamp.

Remedial action component 212 may be used when a user attempts to log in via login component 208 and the Security Flag is set to compromised. In various example, the user may be proactively notified when the Security Flag is set to compromised and request the user login to change their username and/or password. Login component 208 may be a service or API of credential checking system 202 that processes login requests from mobile applications, websites, etc. Login component 208 may be implemented as a web service provided by web server 210. When the Security Flag is set, remedial action component 212 may prompt the user to set a new password before being allowed to proceed. In some example, a user may be forced to change their username as well. The login process is discussed in more detail in FIG. 3.

Figure 3:
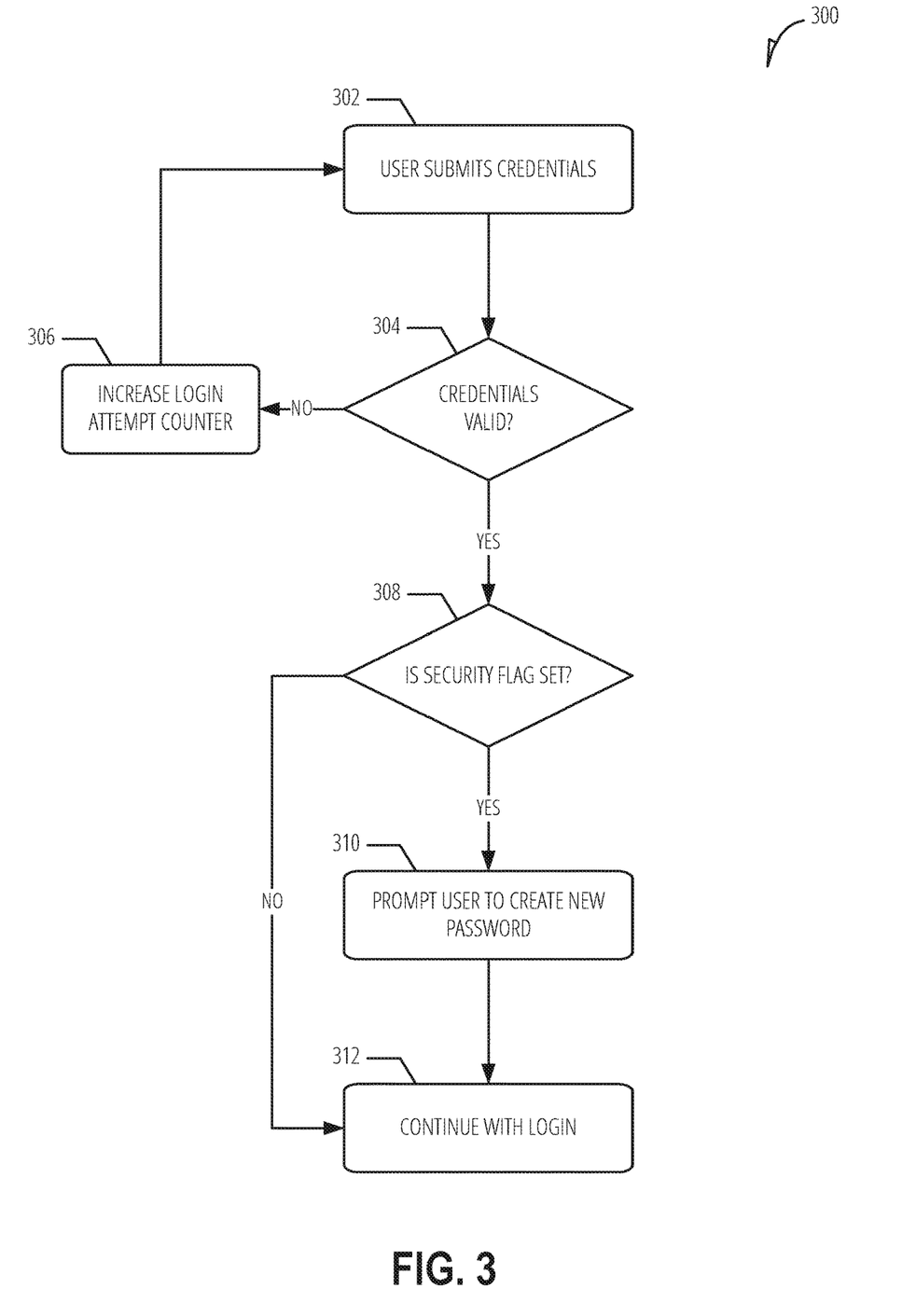
FIG. 3 is a process flow diagram of logging into a system, according to various examples.

FIG. 3 is a process flow diagram of logging into a system, according to various examples. FIG. 3 illustrates operations 302-312. The operations may be performed on a system such as credential checking system 202 in FIG. 2. At operation 302 a user may submit credentials (e.g., via login component 208) to login to credential checking system 202. For example, the user may be logging in to check their checking account balance.

At operation 304 it may be determined whether or not the credentials are valid. For example, a hash of the password entered by the user may be compared to a stored hash of the password for the user based on the entered username. If the credentials are invalid, at operation 306 the account of user matching the entered username may have its login attempt counter increase. Flow continues back to operation 302 to allow the user to attempt to enter a valid password.

If, at operation 304 the credentials are valid, operation 308 may check if a security flag has been set for the user account matching the credentials. For example, a query may be made to compromised accounts 114 or user accounts 204 to check the status of the security flag. If the check indicates the account is compromised, at operation 310, the user is prompted to create a new password. For example, if the user is using a website to log in, a text input box may be presented to enter a new password. The password may be hashed and stored with the user's account. After the password had been changed, at operation 312, the login process may continue (e.g., a landing page or dashboard may be presented). Although not illustrated, the security flag may be cleared.

In various examples, having the security flag set indicate a compromised account restricts other login methods for the user. For example, it is common for a user to use biometrics (e.g., a fingerprint) as a login method that bypasses having to enter in a username/password. Other login methods may be token-based (e.g., OAuth) which also may not require a traditional username/password. Other applications may also use the credentials of the user (e.g., single-sign on). These alternative login methods-anything that is not a regular username/password entry—may be disabled when the security flag is set. Accordingly, when the account is compromised the user may be redirected in the same way to enter in a new password.

Figure 4:
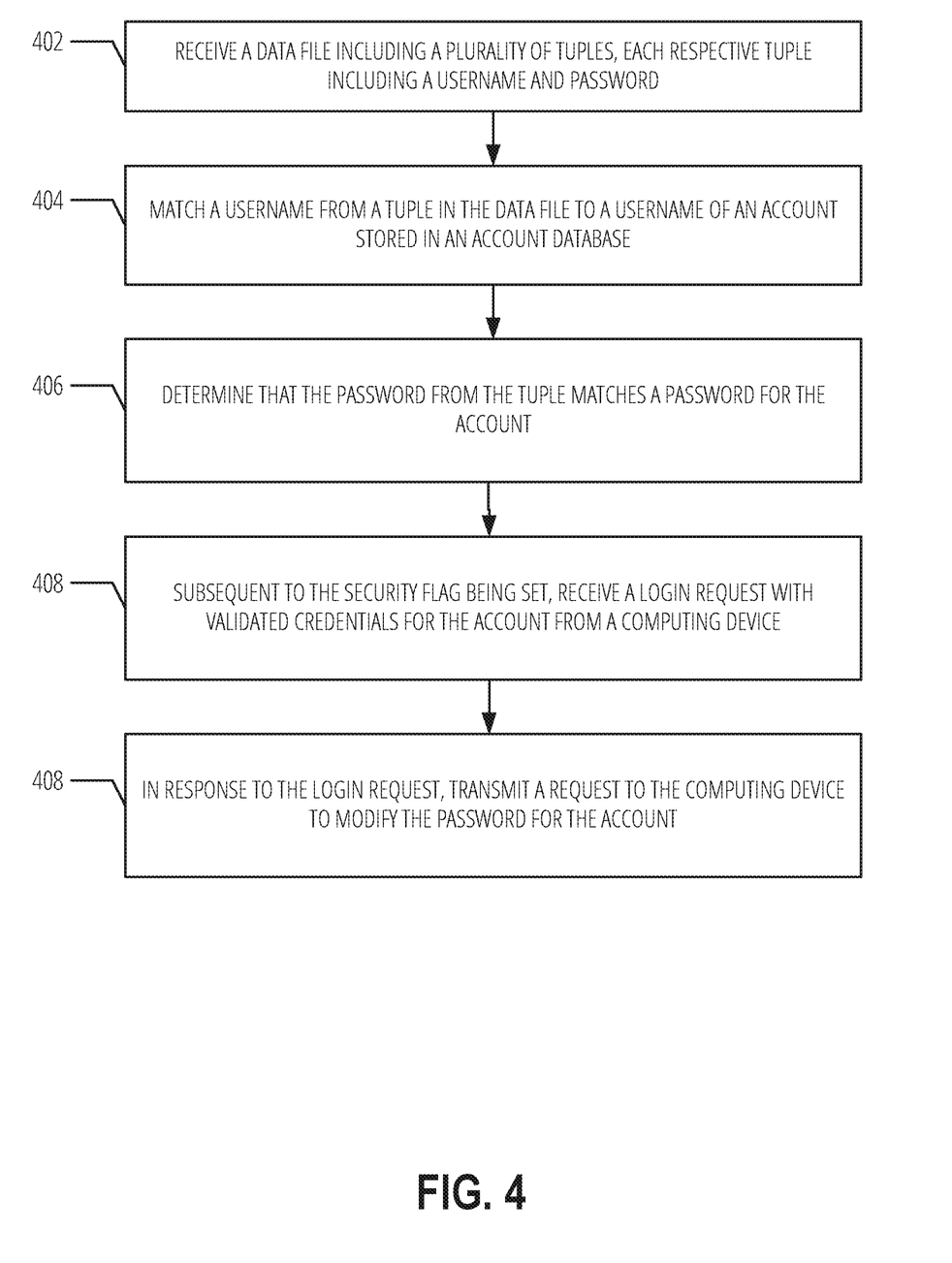
FIG. 4 is a flowchart diagram of a method to check for compromised credentials, according to various examples.

FIG. 4 is a flowchart illustrating a method to check for compromised credentials, according to various examples. The method is represented as a set of blocks that describe operations 402-412 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure. In various examples, operations 402-412 are performed automatically without human input.

At operation 402, in various examples, the method includes receiving a data file including a plurality of tuples. The data file may be a credential file that has been identified in a control file. The control file may identify a plurality of sets of compromised credentials. Each set of compromised credentials may be standardized into a common format.

Each respective tuple in the data file may include a username and password. The password may be hashed in various examples.

At operation 404, in various examples, the method includes matching a username from a tuple in the data file to a username of an account stored in an account database. If the username does not match a username in the account database processing may cease with respect to that username. In some examples, the data file is filtered to exclude tuples with usernames that do not match a username in the account database before processing begins.

At operation 406, in various examples, the method includes determining that the password from the tuple matches a password for the account. Determining may include attempting to log in to the account using the password from the tuple by submitting the hashed password via a login API (e.g., login component 208). In other examples, the account database may be queried with the hashed password from the data file to see if it matches the hashed password for the username in the account database.

At operation 408, in various examples, the method includes in response to the determining indicating a match, setting a security flag for the account identifying the account as compromised. For example, a variable in an account profile for the username may be set.

At operation 410, in various examples, the method includes subsequent to the security flag being set, receiving a login request with validated credentials for the account from a computing device. In various examples, the login request may be in response to notifying the user that their credentials may have been compromised and to login to change them.

At operation 412, in various examples, the method includes in response to the login request, transmitting a request to the computing device to modify the password for the account. Upon receiving a new password, the security flag may be removed. In some examples, additional identification verification information may be required before the security flag is removed. For example, one or more security questions may be presented.

In various examples, having a security flag also means that a subset of a set of login methods are disabled. For examples, the subset of login methods may include biometric methods or login requests from applications using the username as alternative login method.

In some instances, the datafile may include the username more than once. In such an instance attempts may be serially attempted to log in to the account with each respective hashed password from the data file for the username. In various examples, the account is prevented from being locked out during these attempts. For example, the invalid password counter may not be increased during these attempts.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
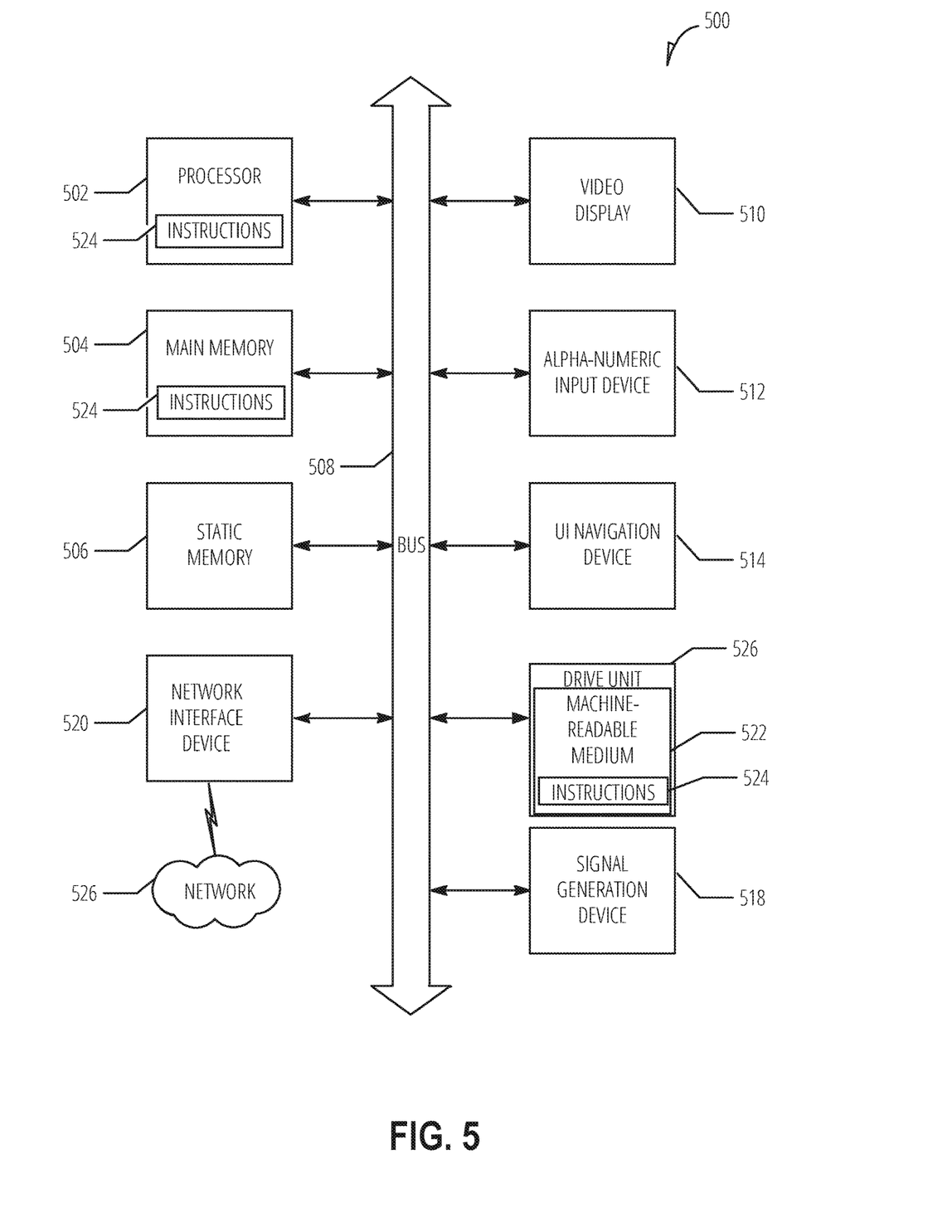
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving a credential data file including a plurality of tuples, each respective tuple including a username and password, the plurality of tuples previously indicated as compromised;
   filtering the credential data file to exclude tuples with usernames that do not match a username in an account database;
   matching a username in multiple tuples of the plurality of tuples in the credential data file to a username of an account stored in the account database;
   determining that the password from a tuple in the multiple tuples of the plurality of tuples matches a password for the account by:
   serially initiating attempts to log in to the account with each respective password in the multiple tuples of the plurality of tuples; and
   preventing the account from being locked out during the attempts;
   in response to the determining indicating a match, setting a security flag for the account identifying the account as compromised;
   subsequent to the security flag being set, receiving a login request with validated credentials for the account from a computing device; and
   in response to the login request, transmitting a request to the computing device to modify the password for the account.

2. The method of claim 1, wherein the respective password of each tuple is hashed.

3. The method of claim 2, wherein determining that the password from the tuple matches a password for the account includes:
   attempting to log in to the account using the password from the tuple by submitting the hashed password via a login API.

4. The method of claim 1, further comprising:
   disabling a subset of a set of login methods in response to the security flag being set.

5. The method of claim 4, wherein the subset of login methods includes biometric login methods.

6. The method of claim 4, wherein disabling the subset of login methods in response to the security flag being set comprises:
   disabling login requests from applications using the username as an alternative login method.

7. The method of claim 1, further comprising, in response to the determining indicating the match:
   transmitting a request to a user associated with username to modify the password; and
   requesting additional identification verification requests before the password may be modified.

8. The method of claim 1, wherein the credential data file is identified in a control file, the control file identifying a plurality of sets of compromised credentials.

9. The method of claim 8, further comprising standardizing each set of compromised credentials into a common format.

10. A non-transitory computer readable medium comprising instructions, which when executed by at least one processor, configure the at least one processor to perform operations comprising:
- receiving a credential data file including a plurality of tuples, each respective tuple including a username and password, the plurality of tuples previously indicated as compromised;
- filtering the credential data file to exclude tuples with usernames that do not match a username in an account database;
- matching a username in multiple tuples of the plurality of tuples in the credential data file to a username of an account stored in the account database;
- determining that the password from a tuple in the multiple tuples of the plurality of tuples matches a password for the account by:
  - serially initiating attempts to log in to the account with each respective password in the multiple tuples of the plurality of tuples; and
  - preventing the account from being locked out during the attempts;
- in response to the determining indicating a match, setting a security flag for the account identifying the account as compromised;
- subsequent to the security flag being set, receiving a login request with validated credentials for the account from a computing device; and
- in response to the login request, transmitting a request to the computing device to modify the password for the account.

11. The computer readable medium of claim 10, wherein the respective password of each tuple is hashed.

12. The computer readable medium of claim 11, wherein determining that the password from the tuple matches a password for the account includes:
- attempting to log in to the account using the password from the tuple by submitting the hashed password via a login API.

13. The computer readable medium of claim 10, wherein the instructions, which when executed by the at least one processor, further configure the at least one processor to perform:
- disabling a subset of a set of login methods in response to the security flag being set.

14. A system comprising:
- at least one processor;
- a storage device comprising instructions, which when executed by at least one processor, configure the at least one processor to perform operations comprising:
  - receiving a credential data file including a plurality of tuples, each respective tuple including a username and password, the plurality of tuples previously indicated as compromised;
  - filtering the credential data file to exclude tuples with usernames that do not match a username in an account database;
  - matching a username from in multiple tuples of the plurality of tuples in the credential data file to a username of an account stored in the account database;
  - determining that the password from a tuple in the multiple tuples of the plurality of tuples matches a password for the account by:
    - serially initiating attempts to log in to the account with each respective password in the multiple tuples of the plurality of tuples; and
    - preventing the account from being locked out during the attempts;
  - in response to the determining indicating a match, setting a security flag for the account identifying the account as compromised;
  - subsequent to the security flag being set, receiving a login request with validated credentials for the account from a computing device; and
  - in response to the login request, transmitting a request to the computing device to modify the password for the account.

15. The system of claim 14, wherein the respective password of each tuple is hashed.

16. The system of claim 15, wherein determining that the password from the tuple matches a password for the account includes:
- attempting to log in to the account using the password from the tuple by submitting the hashed password via a login API.

* * * * *

UNITED STATES PATENT AND TRADEMARK OFFICE
CERTIFICATE OF CORRECTION

| | | |
|---|---|---|
| PATENT NO. | : 11,489,829 B1 | |
| APPLICATION NO. | : 16/721853 | |
| DATED | : November 1, 2022 | |
| INVENTOR(S) | : Ulrich et al. | |

It is certified that error appears in the above-identified patent and that said Letters Patent is hereby corrected as shown below:

In the Claims

In Column 14, Line 16, in Claim 14, after "username", delete "from"

Signed and Sealed this
Twentieth Day of December, 2022

Katherine Kelly Vidal
*Director of the United States Patent and Trademark Office*